Aug. 11, 1942.  A. H. BRASE  2,292,605
HAND TRUCK
Filed Aug. 3, 1940  2 Sheets-Sheet 2

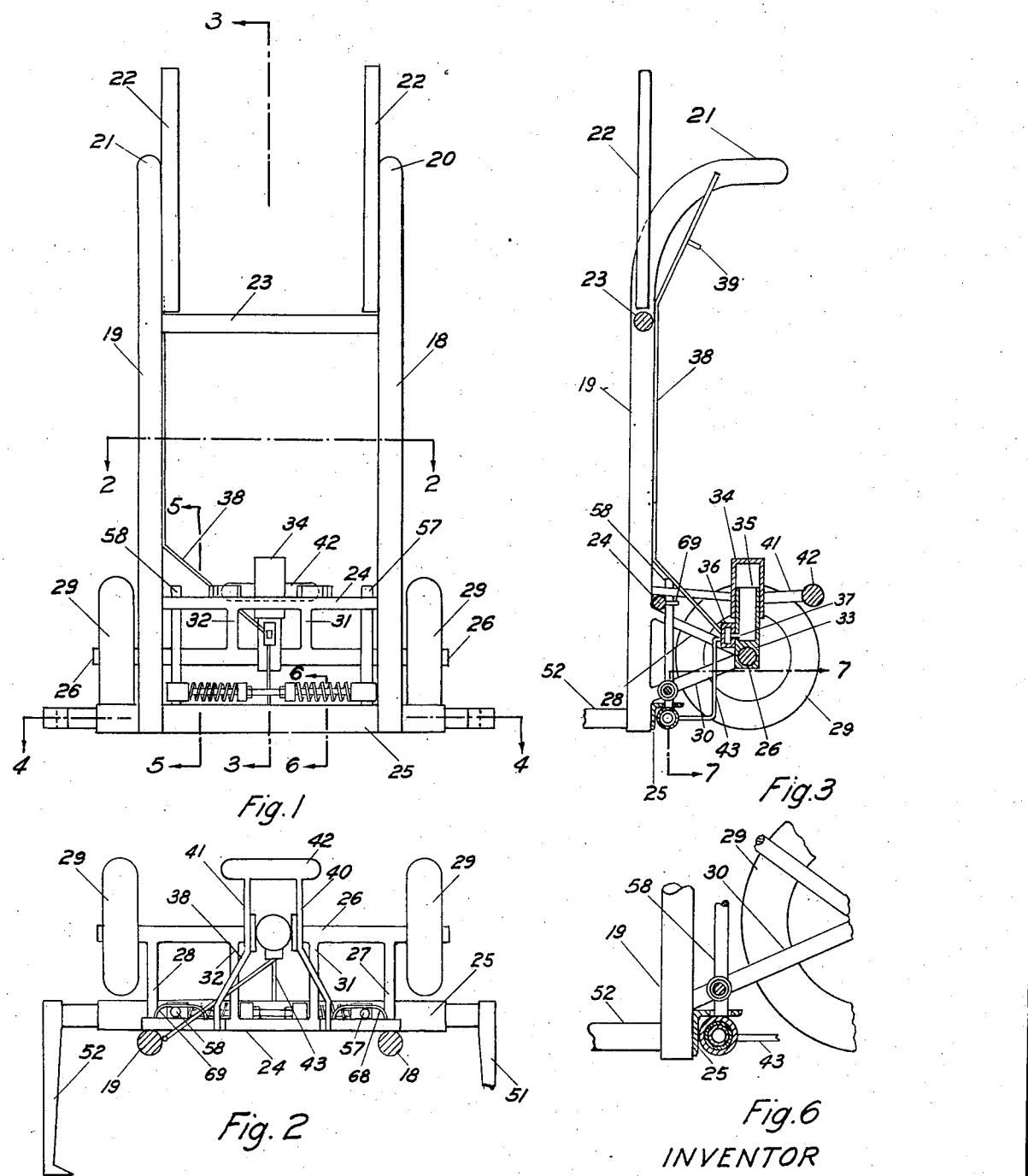

INVENTOR
Arthur H. Brase
per Robt E. Harris
Attorney

Patented Aug. 11, 1942

2,292,605

UNITED STATES PATENT OFFICE 2,292,605

HAND TRUCK

Arthur H. Brase, Orange, Calif., assignor to California Fruit Growers Exchange, Los Angeles, Calif., a corporation of California Application August 3, 1940, Serial No. 350,370

9 Claims. (Cl. 214—65.5)

This invention relates to a hand truck intended to be used for the transportation of boxes or crates. More particularly, this invention relates to a hand truck of this type wherein the gripping arms are operated by hydraulic pressure.

The hand trucks which are at present used for the transportation of stacks of boxes, or other containers, are for the most part adapted to the handling of one particular size of box. Those trucks which are adapted to the handling of more than one size of container ordinarily require mechanical adjustment to effect the change-over from one size to another. The particular advantage of my truck resides in the fact that no mechanical adjustments are necessary to adapt the truck for use with boxes or containers of various sizes. This feature is of great practical advantage since in many cases in which hand trucking is employed the boxes or crates are of various sizes. For example, in citrus packing houses, the box in which the fruit is transported from the field to the packing house is usually of a different size from the box in which the fruit is ultimately shipped. Again we find that different varieties of fruit are shipped in boxes of different size, for example, lemons are shipped in a different size box from oranges. It is obvious, therefore, that the flexibility of use of my truck is extremely advantageous, since it permits the operator to use the truck for various sizes of boxes without first having to stop and make mechanical changes. Accordingly, it is an object of this invention to provide and disclose a hand truck which is adapted to be used for trucking boxes or crates of various sizes.

Further objects of this invention are to provide and disclose a hand truck adapted to be used for the transportation of boxes or crates of various sizes which truck needs no mechanical adjustment to adapt it to such use; a truck wherein the gripping members are hydraulically motivated and in which strong positive pressure may be applied by the gripping members to variously sized boxes or crates; a truck wherein the gripping members are released from the load by the simple trigger motion of a single finger; and in which there is a correlation of movement of the operator in that the grasping of the load and tilting of the truck may be synchronized into one continuous movement.

These and other objects and advantages will appear more fully by referring to the accompanying drawings, in which:

Fig. 1 is a front view of the truck.

Fig. 2 is a plan view of the truck with one gripping member broken away.

Fig. 3 is a vertical, cross-sectional view of the truck taken along the line 3—3 of Fig. 1 and shows details of the hydraulic pressure applying mechanism.

Fig. 6 is a vertical, sectional, detail view taken at the line 6—6 of Fig. 1, showing the spring members and cylinder mechanism.

In general, my invention comprises the ordinary hand truck frame terminating at its upper end is a pair of handles and having a pair of wheels attached at its lower end. Also at the lower end there is attached to the frame a pair of movable gripping members hydraulically actuated, which are adapted to grip objects such as boxes or crates. The pressure of the gripping members against the object being trucked is hydraulically applied and maintained. The frame also carries suitable mechanism for the release of the hydraulic pressure applied to the gripping members.

Figure 4:
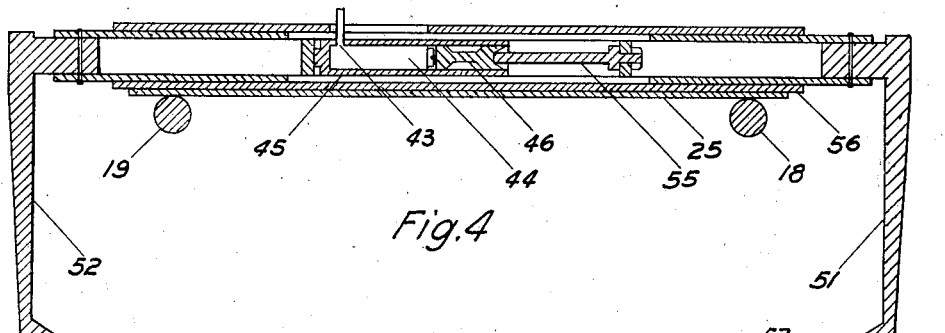
Fig. 4 is a horizontal, cross-sectional view taken along the line 4—4 of Fig. 1 and shows detailed relationship of the gripping members and cylinder mechanism.
Figure 10:
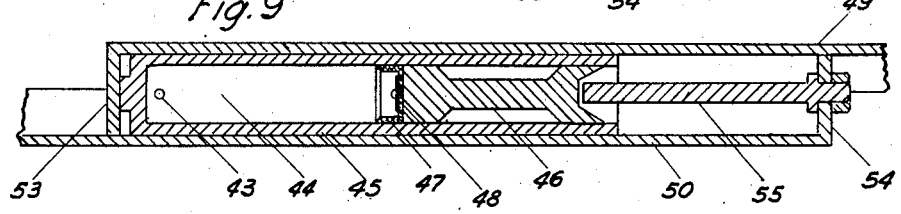
Fig. 10 is an enlarged view showing detail of the floating cylinder and piston.
Figure 5:
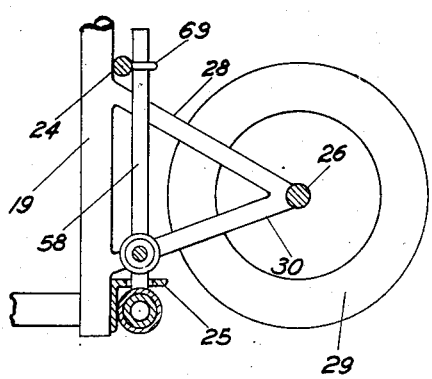
Fig. 5 is a vertical section taken along the line 5—5 of Fig. 1 and shows the relationship of the frame and wheel members.

Referring in detail to the accompanying drawings, in which corresponding parts are designated by the same reference numbers in all figures, there is shown a pair of parallel side members 18 and 19 terminating at their upper ends in handles indicated at 20 and 21. Removably attached to the side members are the extension arms 22. The side members are connected and reinforced by cross-braces 23, 24, and 25, to form a rigid frame. An axle 26 is attached to the frame by means of V-shaped arms 27 and 28, which are attached at their apexes to the axle 26 and at their ends to the side members 18 and 19 respectively. The axle carries a pair of wheels indicated at 29. The lower end 30 of the arm 28 is clearly seen in Fig. 5. Additional braces 31 and 32 from the cross-brace 24 to the axle 26 tend to give further strength and rigidity to the truck. Carried on the axle 26 is a hydraulic actuating means. In the embodiment shown, this comprises a pump shown in detail in Fig. 3, comprising a stationary cylinder 33 and a movable cylinder 34 inverted and tightly fitted over the cylinder 33 to form a chamber 35. A check valve 36 is attached to the stationary cylinder 33 and communicates with it through the outlet 37. A cable 38 extends to and along the side member 19, terminating in a trigger 39. Supported by and turning on the cross-brace 24 and attached to the movable cylinder 34 are a pair of rocker arms 40 and 41, terminating in the foot bar 42. From the check valve 36 a fluid line 43 passes to the chamber 44 formed by the floating cylinder 45 and the piston 46, as clearly seen in Figs. 4, 7, and 10. A piston leather 47 is attached to the piston by means of a bolt 48. The floating cylinder 45 is enclosed within the interfitting, cylindrical, actuating members 49 and 50, said pieces being cut away so as to provide space for the floating cylinder 45. To the outer extremities of the interfitting, cylindrical, actuating members 49 and 50, there are attached respectively the gripping members 51 and 52. The interfitting, cylindrical, actuating member 49 terminates at its inner extremity in an end abutment 53, while the interfitting, cylindrical, actuating member 50 terminates at its inner extremity in an end abutment 54, through which there is centrally fastened an adjustable stop 55. These interfitting, cylindrical, actuating members 49 and 50 are themselves enclosed within a cylindrical casing 56 supported by cross-brace 25. Attached to the interfitting, cylindrical, actuating members 49 and 50 and extending perpendicularly through the casing 56, are two posts 57 and 58, over which are fastened collars 59 and 60, into which is fitted the spring rod 61. A pair of expansion springs 62 and 63 are maintained in position on the spring rod 61 by means of the washers 64 and 65 and the nuts 66 and 67. Said posts 57 and 58 are maintained in position at their upper ends by means of the post guides 68 and 69, attached to the back of the cross-brace 24.

The operation of my truck is carried on as follows:

With the truck in an upright position, as shown in Fig. 1, the operator grasps the handles 20 and 21 and tilts the truck backward on the wheels and rolls it toward the box or boxes to be moved. Positioning the truck along one side of the box with the gripping members 51 and 52 in extended position, the operator tilts the truck forward so that the gripping members will be in a position to grasp the ends of the box. Now pressing downward with his foot on the foot bar 42, he forces the movable cylinder 34 downward and in so doing forces fluid from the chamber 35 through the check valve 36 by way of the outlet 37. The fluid passes through the fluid line 43 to the chamber 44.

Figure 7:
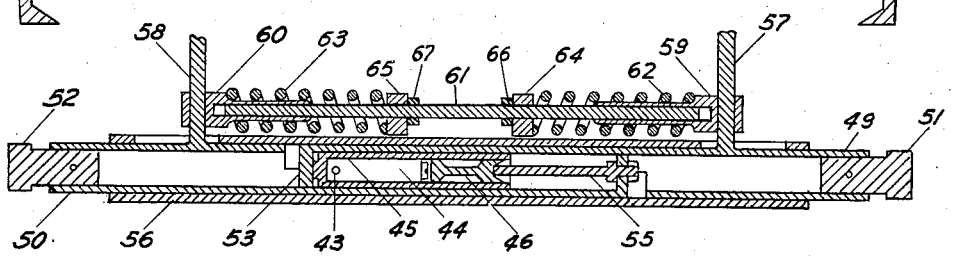
Fig. 7 is a horizontal, cross-sectional view of the actuating mechanism of the truck for operating the gripping members, and is taken as indicated at 7—7 of Fig. 3.
Figure 8:
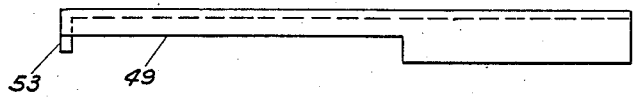
Fig. 8 shows detail of the right interfitting cylindrical actuating member.
Figure 9:
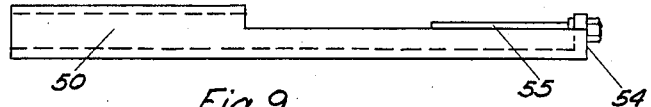
Fig. 9 shows detail of the left interfitting cylindrical actuating member.

By referring to Fig. 7, the action which takes place as fluid is forced into the chamber 44 may best be followed and understood. As the fluid is forced into the chamber 44, the pressure therein is increased and the piston 46 is forced against the adjustable stop 55, while at the same time the floating cylinder 45 is forced against the end abutment 53, resulting in forcing the interfitting, cylindrical, actuating member 49 to the left and the interfitting, cylindrical, actuating member 50 toward the right. As is apparent, the movement of the interfitting, cylindrical, actuating members 49 and 50 to the left and right respectively draws the gripping members 51 and 52 against the ends of the box. The amount of force applied by these gripping members is dependent upon the amount of hydraulic pressure exerted within the chamber 44.

In view of the fact that the perpendicular posts 57 and 58 are respectively attached to the interfitting, cylindrical, actuating members 49 and 50, it becomes apparent that as these members move to the left and right the perpendicular posts will follow this motion and move toward each other. As these posts 57 and 58 move toward each other, the expansion springs 62 and 63 are compressed between their respective collars 59 and 60 and washers 64 and 65.

When the gripping members have engaged the end of the box, the operator tilts the truck backward on the wheels and rolls the load to its new location. Reaching the place where the load is to be deposited, he tilts the truck forward until the bottom of the box rests on the floor and then pulls the trigger 39, which acts through the cable 38, and releases the check valve 36 and causes the gripping members to be extended, thus releasing the load.

By referring to Figs. 3 and 7, the releasing action may best be followed. As soon as the trigger 39 is pulled and the check valve 36 thereby released, fluid which is under pressure within the chamber 44 may flow back by way of the fluid line 43 into the chamber 35, thereby forcing the movable cylinder 34 upward. Since the foot bar 42 is attached to the rocker arms 40 and 41, and they in turn are attached to the movable cylinder 34, it also will be forced upward. This movement of fluid back into the chamber 35 is motivated by the expansion springs 62 and 63, which force the perpendicular posts 57 and 58, apart, and move the interfitting, cylindrical, actuating members 49 and 50 which are attached to these posts to the right and left respectively. As the interfitting, cylindrical, actuating member 49 moves toward the right, the floating cylinder 45 is also moved toward the right by the impingement of the end abutment 53 against the end of the floating cylinder 45. At the same time, the movement of the interfitting, cylindrical, actuating member 50 toward the left forces the adjustable stop 55 against the back of the piston 46, thereby moving the piston toward the left. This movement of the piston 46 toward the left and the floating cylinder 45 toward the right decreases the volume of the chamber 44 and consequently forces the fluid out through the line 43. At the same time that the fluid is being forced back into the chamber 35, the gripping members are disengaged from the ends of the box, and the operator is immediately ready to roll the truck away to pick up another load.

Manifestly the limits of movement of the gripping members is controlled by the construction of the actuating mechanism. It is clear that these limits may be increased by increasing the distance through which the interfitting, cylindrical, actuating members travel. A corresponding increase in the length of the floating cylinder would, of course, be necessary.

Numerous changes and modifications in details and general arrangement of the several parts of my device will be obvious to those skilled in the art and may be made without departing from the spirit of my invention. All such changes and modifications as are properly embraced thereby are intended to be included within the scope of the appended claims.

Having thus described my invention in such full, clear, and concise language as to enable others skilled in the art to make and use the same, I claim as my invention and desire to secure by Letters Patent the following:

1. In a hand truck a compression device comprising a stationary cylinder and a movable cylinder inverted and tightly fitted over said stationary cylinder and having a treadle bar attached thereto, a check valve communicating with the compression device, trigger means for releasing said check valve, an expansion mechanism comprising a floating cylinder and piston enclosed within a pair of interfitting cylindrical members having gripping members attached to the outer extremities thereof, said interfitting cylindrical members operating in connection with a spring device whereby the gripping members may be drawn toward each other by the motive fluid force from the compression device through the check valve and trigger means to the expansion mechanism within the said interfitting cylindrical members and whereby said gripping members may be forced away from each other by the spring mechanism.

2. In a hand truck, hydraulic means for actuating a pair of gripping members toward each other and automatic locking means therefor, trigger means for releasing said locking mechanism, and a spring mechanism adapted to force said gripping members away from each other.

3. In a hand truck, the combination of a fluid compression device for producing motive fluid force and a pair of interfitting cylindrical members having gripping arms attached thereto, an hydraulic expansion mechanism within the said interfitting cylindrical members, said gripping arms being actuated toward each other by the motive fluid force from the compression device, and a spring mechanism attached to said interfitting cylindrical members and adapted to force said gripping arms away from each other.

4. In a hand truck the combination of a fluid compression device, a check valve, and a pair of interfitting cylindrical members, said interfitting cylindrical members being actuated toward each other by the motive fluid force from the compression device through the check valve to the said interfitting cylindrical members, a spring mechanism attached to and adapted to force said interfitting cylindrical members away from each other.

5. In a hand truck, the combination of a fluid compression device and a pair of interfitting members having gripping arms attached thereto, an hydraulic expansion mechanism comprising a floating cylinder and piston enclosed within the pair of interfitting members, said interfitting members being actuated toward each other by the motive fluid force from the compression device to the expansion mechanism, and a spring mechanism attached to and adapted to force said interfitting members away from each other.

6. In a hand truck, the combination of a fluid compression device, a check valve, and an expansion mechanism comprising a floating cylinder and piston, said expansion mechanism being enclosed within a pair of interfitting cylindrical members, said interfitting cylindrical members being actuated toward each other by the motive fluid force from the compression device through the check valve to the hydraulic expansion mechanism, and a spring mechanism attached to and adapted to force said interfitting cylindrical members away from each other.

7. An hydraulic expansion mechanism comprising a floating cylinder and piston enclosed within a pair of interfitting cylindrical members.

8. An hydraulic expansion mechanism comprising a compression device comprising a stationary cylinder and movable cylinder inverted and tightly fitted over said stationary cylinder and having a treadle attached thereto, a check valve communicating with the compression device, and an expansion mechanism comprising a pair of interfitting members and a floating cylinder and piston enclosed within said interfitting members, said interfitting members being adapted to be drawn toward each other by the motive fluid from the compression device through the check valve to the expansion mechanism within the said interfitting members.

9. In a hand truck, the combination of a fluid compression device for producing motive fluid force and a pair of interfitting cylindrical members having gripping arms attached thereto, said gripping arms being actuated toward each other by the motive fluid force from the compression device, and a spring mechanism attached to said interfitting cylindrical members and adapted to force said gripping arms away from each other.

ARTHUR H. BRASE.